(12) United States Patent
Teflian et al.

(10) Patent No.: US 11,496,442 B2
(45) Date of Patent: Nov. 8, 2022

(54) SYSTEM AND METHOD FOR DETECTING AND RESPONDING TO THEFT OF SERVICE DEVICES

(71) Applicant: Charter Communications Operating, LLC, St. Louis, MO (US)

(72) Inventors: Mark Teflian, St. Louis, MO (US); Isaiah Connell, St. Louis, MO (US); James Randall Pettus, St. Louis, MO (US)

(73) Assignee: Charter Communications Operating, LLC, St. Louis, MO (US)

( * ) Notice: Subject to any disclaimer, the term of this patent is extended or adjusted under 35 U.S.C. 154(b) by 88 days.

(21) Appl. No.: 16/784,625

(22) Filed: Feb. 7, 2020

(65) Prior Publication Data

US 2021/0250325 A1    Aug. 12, 2021

(51) Int. Cl.

| | |
|---|---|
| *G06F 15/177* | (2006.01) |
| *H04L 61/5014* | (2022.01) |
| *H04L 12/28* | (2006.01) |
| *H04L 61/5046* | (2022.01) |
| *H04L 61/5061* | (2022.01) |
| *H04L 101/622* | (2022.01) |

(52) U.S. Cl.
CPC ...... *H04L 61/5014* (2022.05); *H04L 12/2801* (2013.01); *H04L 61/5046* (2022.05); *H04L 61/5061* (2022.05); *H04L 2101/622* (2022.05)

(58) Field of Classification Search
CPC ............. H04L 61/2015; H04L 12/2801; H04L 61/2046; H04L 61/6022; H04L 61/2061

USPC ................. 709/220, 222, 223, 224
See application file for complete search history.

(56) References Cited

U.S. PATENT DOCUMENTS

| | | | |
|---|---|---|---|
| 7,272,846 B2 | 9/2007 | Williams et al. | |
| 8,260,941 B2 | 9/2012 | Danforth et al. | |
| 9,949,165 B2* | 4/2018 | Gupta | ............... H04W 48/06 |
| 10,050,937 B1* | 8/2018 | Gandhewar | ......... H04L 63/0254 |
| 2008/0109864 A1* | 5/2008 | Danforth | ............... H04L 12/28 |
| | | | 725/111 |
| 2010/0070639 A1* | 3/2010 | Hoggan | ............... H04L 63/10 |
| | | | 709/229 |
| 2015/0281274 A1* | 10/2015 | Masurekar | ......... H04L 63/1466 |
| | | | 726/22 |
| 2015/0373027 A1* | 12/2015 | Gupta | ............... H04L 61/6022 |
| | | | 726/4 |
| 2017/0264626 A1* | 9/2017 | Xu | ............... H04L 63/1441 |

(Continued)

*Primary Examiner* — Lan Dai T Truong
(74) *Attorney, Agent, or Firm* — The Marbury Law Group, PLLC

(57) ABSTRACT

Systems, methods, and devices for identifying and responding to illegitimate devices on a service provider network include computing devices that are configured to collect dynamic host configuration protocol (DHCP) information related to a device (e.g., a modem, etc.) that establishes or requests to establish an internet protocol (IP) connection to the service provider network. The computing devices may determine features based on the collected DHCP information, apply the determined features to a classification model, and predict whether the device is an illegitimate device based on a result of applying the determined features to the classification model. The computing devices may perform a responsive action (e.g., blacklist or quarantine the device, etc.) in response to predicting that the device is an illegitimate device.

39 Claims, 5 Drawing Sheets

(56) References Cited

U.S. PATENT DOCUMENTS

| | | | |
|---|---|---|---|
| 2018/0020000 A1* | 1/2018 | Rzezak | H04N 21/25816 |
| 2019/0149515 A1* | 5/2019 | Sharma | H04L 63/1441 |
| | | | 726/11 |
| 2020/0151622 A1* | 5/2020 | Mermoud | H04L 67/303 |
| 2021/0099552 A1* | 4/2021 | Reynolds | H04W 88/08 |

* cited by examiner

SYSTEM AND METHOD FOR DETECTING AND RESPONDING TO THEFT OF SERVICE DEVICES

BACKGROUND

A theft of service (TOS) attack is a cyberattack in which a person or entity obtains access to a resource or service (e.g., bandwidth, network access, Internet Protocol (IP) services, etc.) without lawfully compensating the service provider for the use of those resources or services. Increasingly, ToS attacks are being perpetuated by nefarious actors through a variety of different types of unauthorized or illegitimate devices, such as rogue modems, orphan modems, cloned modems, persistent duplicate MAC addresses, etc.

Generally, a rogue modem is a modem that represents a media access control (MAC) address on the network, but which is not associated with a valid subscriber or billing account. An orphan modem is a modem that was once associated with a valid subscriber or billing account, but the subscriber or billing account is no longer active, does not have a current billing status, and/or which should otherwise be disconnected. Both rogue and orphan modems may be cloned (i.e., may be a clone rogue modem or a clone orphan modem). A cloned modem is a duplicate of a modem or a MAC address that is, or once was, associated with a legitimate subscriber or billing account, but which could be used by a nefarious actor to obtain network access without compensating the service provider.

These unauthorized or illegitimate devices (e.g., rogue modems, cloned modems, etc.) may cause network congestion and/or consume a significant amount of limited network resources (e.g., network bandwidth, etc.) without compensating the service provider for the use of those resources. In addition, these unauthorized or illegitimate devices are being increasingly used by hackers, thieves, organized fraud rings, and other nefarious actors to launch cyber-attacks, gain remote control of devices, steal private or sensitive information, hide their true identities, or engage in other malicious activities. Accordingly, new and improved solutions that better identify and respond to unauthorized or illegitimate devices will be beneficial to internet service providers and the consumers of their services.

SUMMARY

The various aspects include methods of identifying and responding to illegitimate devices on a service provider network, which may include collecting dynamic host configuration protocol (DHCP) information related to a device that establishes or requests to establish an internet protocol (IP) connection to the service provider network, determining features based on the collected DHCP information, applying the determined features to a classification model, predicting whether the device is an illegitimate device based on a result of applying the determined features to the classification model, and performing a responsive action in response to predicting that the device is an illegitimate device.

In some aspects, the methods may include validating the prediction of whether the device is an illegitimate device based on the result of applying the determined features to the classification model. In some aspects, validating the prediction of whether the device is an illegitimate device based on the result of applying the determined features to the classification model includes receiving internet protocol detail records (IPDRs) from a network device deployed in the service provider network, using the received IPDRs to identify duplicate media access control (MAC) addresses on the service provider network, and determining whether any of the identified duplicate MAC addresses are persistent duplicates, determining whether a MAC address of the device matches the MAC address of at least one of the persistent duplicates, and validating that the device is an illegitimate device in response to determining that the MAC address of the device matches the MAC address of at least one of the persistent duplicates. In some aspects, validating the prediction of whether the device is an illegitimate device based on the result of applying the determined features to the classification model includes determining whether the device corresponds to at least one active billed customer account, validating that the device is an illegitimate device in response to determining that the device does not correspond to the at least one active billed customer account.

In some aspects, performing the responsive action in response to predicting that the device is an illegitimate device may include at least one or more of performing the responsive action prior to a DHCP server granting a DHCP lease to the device, performing the responsive action prior to the device registering the DHCP lease with a cable modem termination system (CMTS), or performing the responsive action prior to the device establishing the IP connection to the service provider network. In some aspects, determining the features based on the collected DHCP information may include decoding one or more DHCP fields in a DHCP log to generate one or more decoded values, and separating the one or more decoded values into one or more individual features.

In some aspects, decoding the one or more DHCP fields in the DHCP log to generate the one or more decoded values may include decoding at least one or more of a vendor encapsulated options field within a vendor-opts data field in the DHCP log to generate the one or more decoded values, and separating the one or more decoded values into the one or more individual features include separating the one or more decoded values into at least one or more of a device type, an embedded-components-list, a device-serial-number, a hardware-version-number, a software-version-number, a boot-rom-version, an organizationally unique identifier (OUI), a vendor-OUI, a model-number, or a vendor-name.

In some aspects, collecting the DHCP information related to the device that establishes or requests to establish the IP connection to the service provider network may include collecting the DHCP information related to a cable modem that establishes or requests to establish the IP connection to the service provider network, and performing the responsive action in response to predicting that the device is an illegitimate device may include blacklisting the cable modem on a cable modem termination system (CMTS) in response to predicting that the cable modem is an illegitimate device.

In some aspects, the methods may include selecting the responsive action based on the result of applying the determined features to the classification model. In some aspects, the classification model may include a plurality of decision nodes that each include a weight value and a test condition. In some aspects, applying the determined features to the classification model may include generating a plurality of numeric values that each provide an answer to a condition tested by one of plurality of decision nodes, and computing a weighted average of the plurality of numeric values, and in which predicting whether the device is an illegitimate device based on the result of applying the determined features to the classification model may include determining whether the computed weighted average exceeds a threshold value, and classifying the device as an illegitimate device in response to determining that the weighted average exceeds the threshold value.

In some aspects, the methods may include retraining the classification model based on at least one or more of previous responsive actions, previous DHCP information. previous aggregated internet protocol detail records (IPDRs) and subscriber account management interface specification (SAMIS), or previous aggregated measures collected from deep packet inspection (DPI). In some aspects, the methods may include predicting whether another device is an illegitimate device based on the result of applying the determined features to the retrained classification model. In some aspects, the methods may include determining association rules that identify relationships between two or more cable modem termination systems (CMTSs) based on associations with connected media access control (MAC) addresses, analyzing strong lift and confidence values in the association rules to detect connected fraud ring clone activity.

Further aspects may include a computing system having a processor configured with processor-executable instructions to perform various operations corresponding to the methods discussed above.

Further aspects may include a computing system having various means for performing functions corresponding to the method operations discussed above.

Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
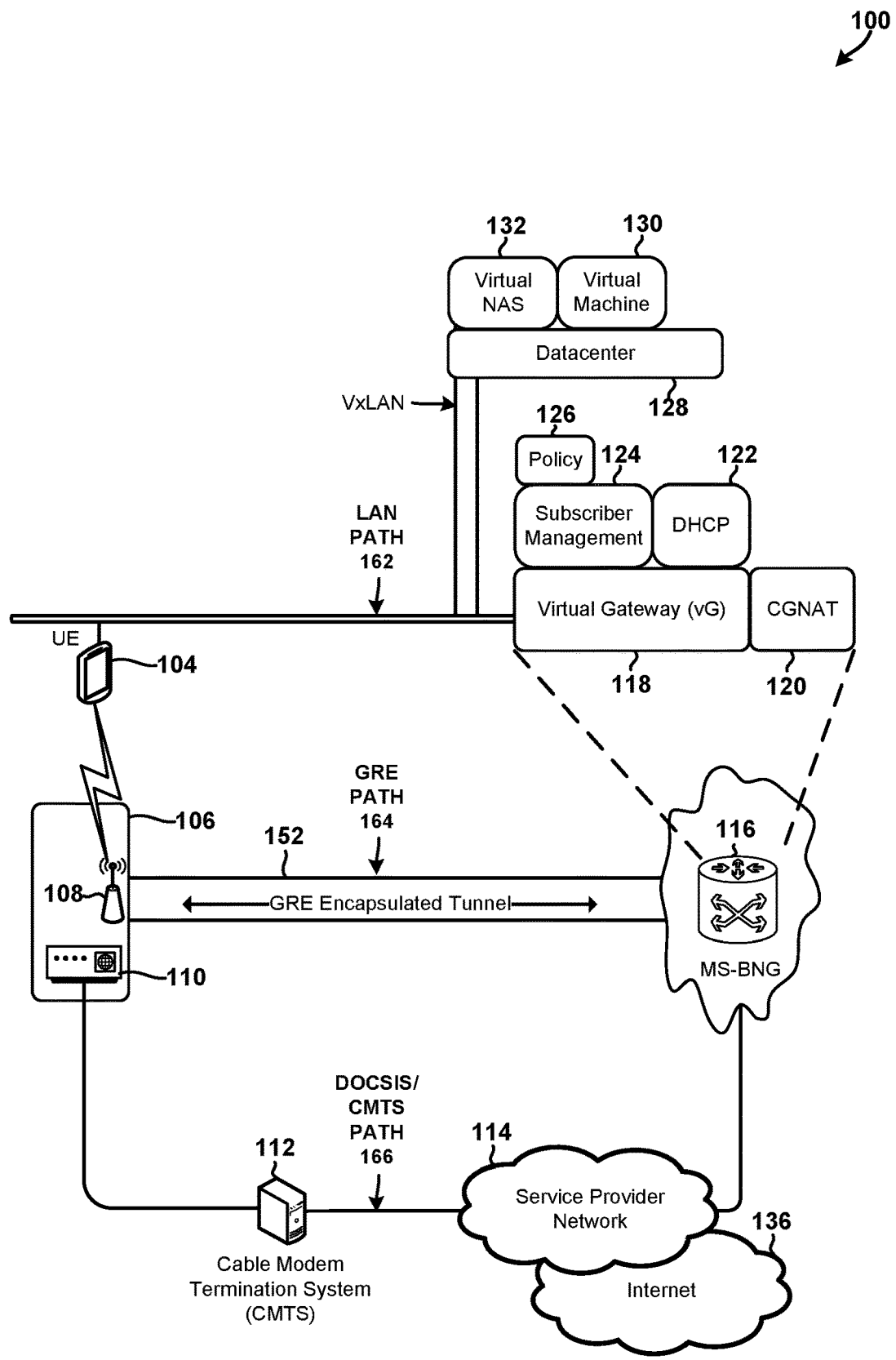
FIG. 1 is a block diagram of a system in which illegitimate devices could operate and which would benefit from using dynamic host configuration protocol (DHCP) information to identify and respond to illegitimate devices in accordance with some embodiments.

The various embodiments are described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and computing systems (e.g., security servers, DHCP servers, cable modems, etc.) configured to implement the methods, for using prediction or machine learning techniques to identify and respond to illegitimate devices on a service provider network.

A computing system may be configured to select for evaluation any device (e.g., modem) that establishes, or requests to establish, an internet protocol (IP) connection to the service provider network. The computing system may collect or obtain DHCP information related to the selected device. The computing system may use the collected DHCP information to determine or engineer features, which may be units of information that represent a property, characteristic, condition, activity, or behavior associated with the network or the selected device.

The computing system may apply the determined features to a classification model, which may be an information structure that includes decision nodes that may be used to evaluate the features. The application of the determined features to the classification model may generate one or more values (or an evaluation result) that may be used by the computing system to predict whether the selected device is an illegitimate device. The computing system may predict whether the selected device is an illegitimate device based on the evaluation result. The computing system may perform a responsive action (e.g., blacklist or quarantine the device, etc.) in response to predicting that there is a high probability that the selected device is an illegitimate device.

The term "illegitimate device" is used herein to refer to a media access control (MAC) address or device (e.g., cable modem, etc.) that is not being used or operated in accordance with standards, policies or rules set forth by a service provider network. For example, an illegitimate device may be an unauthorized device that uses the resources or services of the service provider network without proper authorization from the service provider network and/or without lawfully compensating the service provider network. An illegitimate device may also be a device that is authorized to use the resources or services of the service provider network, but which has been hijacked or is otherwise not being used or operated in accordance with standards, policies or rules set forth by the service provider network.

The terms "theft of service device" and "TOS device" may be used interchangeably herein to refer to a device that allows a person or entity to obtain access to a network resource or service without lawfully compensating the service provider network.

The term "cloned modem" may be used herein to refer to a duplicate of a modem or a MAC address. A cloned modem may be a perfect clone or an imperfect clone. Cloned modems are illegitimate devices that may used by nefarious actors as a TOS device, to launch cyber-attacks, to gain remote control of devices, to steal private or sensitive information, to hide their true identities, or to engage in other malicious activities.

The term "rogue modem" may be used in this application to refer to an illegitimate device that represents a MAC address on the network but which is not associated with a valid subscriber or billing account. A rogue modem may be a cloned modem (i.e., may be a cloned rogue modem).

The term "orphan modem" may be used in this application to refer to a device that was once associated with a valid subscriber or billing account, but the subscriber or billing account is no longer active, does not have a current billing status, and/or which should otherwise be disconnected. An orphan modem may be a cloned modem (i.e., may be a cloned orphan modem) or an illegitimate device.

The term "service provider network" is used generically herein to refer to any network suitable for providing consumers with access to the Internet or IP services over broadband connections, and may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The term "computing system" may be used generically herein to refer to any electronic device that includes a programmable processor, memory and circuitry for providing the functionality described herein. As such, a computing system may include any one or all of modems, routers, network switches, network bridges, residential gateways (RG), access nodes (AN), bridged residential gateway (BRG), fixed mobile convergence products, home networking adapters and Internet access gateways that enable consumers to access communications service providers' services, satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (for example, ROKU™) smart televisions, digital video recorders (DVRs), and similar electronic devices which include a programmable processor and memory and circuitry for providing the functionality described herein.

A cable modem is a type of network bridge that provides bi-directional data communication via radio frequency channels on coaxial cable infrastructure, a hybrid fiber-coaxial (HFC), radio frequency over glass (RFoG) or other similar technologies. Cable modems are primarily used to deliver broadband Internet access in the form of cable Internet, taking advantage of the high bandwidth of a HFC or RFoG network.

For ease of reference, some of the embodiments in this application are discussed with reference to a modem or cable modem. While the embodiments are particularly useful for identifying and responding to modems and other edge devices that register with a cable modem termination system (CMTS), it should be understood that the embodiments may apply to any type of computing system that uses DHCP to establish IP connectivity. Therefore, the various embodiments disclosed in this application should be limited in scope to modems or cable modems unless expressly recited.

An internet protocol detail record (IPDR) is a data structure that includes information about IP-based service usage and other activities of IP-connected devices. For example, IPDRs commonly include a time stamp, a device ID, and various measures of service usage (e.g., total traffic usage by a device associated with the device ID, etc.). An IPDR may be generated by and collected from access network equipment or other similar network components.

The dynamic host configuration protocol (DHCP) is a network management protocol that is used on User Datagram Protocol/Internet Protocol (UDP/IP) networks whereby a DHCP server dynamically assigns an IP address and other network configuration parameters to DHCP client devices (e.g., cable modem, UE, set-top box, etc.).

In DOCSIS networks, a cable modem establishes IP connectivity by requesting a lease from the DHCP server and registering with the cable modem termination system (CMTS). For example, to establish IP connectivity, the cable modem may generate a DHCP request message that includes various information fields, and broadcast the DHCP request message for reception by the DHCP server. The DHCP server may receive the DHCP request message, and use the information included in the received message to determine whether to grant or deny the cable modem a lease. The DHCP server may generate a DHCP response message that includes network and lease information (e.g., lease granted or denied, lease terms, etc.), and send the message to the cable modem. The cable modem may receive the DHCP response message, and use the network and lease information included in the received message to establish an IP connection to the network.

Hackers and malicious actors may exploit various software or hardware defects in conventional cable modems and/or alter the information included in the DHCP request/response messages to convert a legitimate device (e.g., legitimate cable modem) or MAC address into an illegitimate device (e.g., rogue modem, orphan modem, cloned modem, etc.). These hackers/malicious actors may create and deploy the illegitimate devices rapidly and with relative ease. As such, there are often many (a multitude of) illegitimate devices present on the network at any given time that may used to launch cyber-attacks, to gain remote control of devices, steal private or sensitive information, or engage in other nefarious or malicious activities. In addition, these illegitimate devices may cause network congestion and/or consume a significant amount of the often limited resources of the network (e.g., network bandwidth, etc.) without compensating the service provider for the use of those resources.

Existing and conventional security solutions are not adequate for identifying and responding to the multitude of illegitimate devices present on the network. This is because existing and conventional security solutions are slow, inaccurate, expensive, labor intensive, reactive and/or not sufficiently responsive to continuing dynamic theft of services on the network. Hackers and malicious actors can create new illegitimate devices much faster than these solutions can identify and deactivate such illegitimate devices. In addition, existing and convention security solutions may not differentiate between legitimate and illegitimate devices with a high degree of accuracy due to various billing, provisioning and network configurations and other exploits within these systems. For all these reasons, it is challenging to eliminate or significantly reduce the number of illegitimate devices present on the network for a prolonged period of time.

The various embodiments include computing systems (e.g., security server, cable modem, DHCP server, etc.) configured to collect and use DHCP information to predict, identify, prevent and/or respond to illegitimate devices more rapidly, more accurately, and more effectively than existing or conventional solutions.

Generally, as part of the operations for establishing or using the IP connection, the DHCP server and/or client generate or update DHCP log that includes various different types DHCP information, such as default gateway, domain name, the name servers, time servers, MAC addresses, hostnames, client IP address (ciaddr), your client IP address (yiaddr), server IP address (siaddr), gateway address (giaddr), client hardware address (chaddr), DHCP message type, DHCP parameter request list, packet length, message length, DHCP class identifier, vendor-identifying vendor options, enterprise-id, options request option (ORO), option-code, option length, modem-capabilities, vendor opts option, vendor encapsulated options, DHCP client identifier, DHCP request address, DHCP server identifier, etc.

In some embodiments, a computing system may configured to collect and use any or all such DHCP information, in conjunction with context information received from other sources, to implement apply or use machine learning, artificial intelligence, pattern recognition, predictive modeling, decision blacklisting and/or other similar techniques or technologies to predict, identify, prevent and/or respond to illegitimate devices. The computing systems may respond to illegitimate devices (e.g., by blacklisting them on the CMTS, etc.) on a batch basis and/or in real time (e.g., at the time of the DHCP lease grant, etc.). For example, the computing system may predict which devices are likely to be illegitimate devices, and prevent those devices from establishing IP connectivity to the network (e.g., by denying DHCP request, etc.).

In some embodiments, a computing system may be configured to use the DHCP information to build, train or update classification models. In some embodiments, the computing system may be configured to use the DHCP information to create, define, compute, or update features or feature vectors. In some embodiments, the computing system may be configured to use the DHCP information to perform feature selection and/or feature reduction operations. In some embodiments, the computing system may be configured to use the DHCP information to generate feature vectors or to determine the features that are to be included in a feature vector.

A classification model may be a model that includes data and/or information structures (e.g., decision nodes, component lists, etc.) that may be used to evaluate the features in a feature vector. A feature may be an information structure or unit that represents an observed condition, activity or behavior associated with the network or a specific computing system. Each feature may include a feature value (e.g., a number, symbol, etc.) that represents all or a portion of the observed condition, activity or behavior. Each feature may also be associated with a data type that identifies a range of possible values (e.g., a range for the feature value), operations that may be performed on those values, meanings of the values, etc. The data type may be used by a computing system to determine how the feature (or its feature value) should be measured, analyzed, weighted, or used.

Each classification model may include multiple heterogenous or homogenous decision nodes (e.g., linear classifiers, decision trees (e.g., gradient boosted decision trees, etc.), probabilistic or naïve classifiers, gradient boosted methods, ensemble classifiers, neural networks, and blended models, etc.), and each decision node may include a weight value and a test question/condition that is suitable for evaluating a feature. For example, a classification model may include a decision node that evaluates the condition "is the frequency of IP connection attempts less than X per minute." In this example, applying a feature vector that includes an "IP connection attempt" feature having a feature value of "3" to the classification model may generate a result that indicates a "yes" answer (for "less than X" connection attempts) or a "no" answer (for "X or more" connection attempts) via a symbol or a number, such as "1" for "yes" and "0" for "no".

Since each classification model may include multiple decision nodes and each feature vector may include multiple features, applying a feature vector to a classification model may generate a plurality of answers to a plurality of different test questions/conditions. Each of these answers may be represented by a numerical value. The computing system may multiply each of these numerical values with their respective weight value to generate a plurality of weighted answers. The computing system may then compute or determine a weighted average based on the weighted answers, compare the computed weighted average to a threshold value, and classify an computing system as an illegitimate device based on the comparison results. For example, if the computed weighted average is "0.95" and the threshold value for illegitimate devices is "0.80," the computing system may classify the device as "illegitimate" with a high degree of confidence because the computed weighted average exceeds the threshold value (i.e., "0.95">"0.80").

In some embodiments, the computing system may be configured to create or update the features or feature vectors dynamically. This allows the computing system to dynamically update how the collected DHCP information is analyzed or used. As a result, the computing system may better respond to changes in network conditions, better represent or evaluate new information about illegitimate devices, better identify illegitimate devices, better identify and respond to illegitimate devices, etc.

There are multiple ways in which a feature may be created or updated. For example, a computing system may create or update a feature by preprocessing the collected DHCP information, performing statistical computations (e.g., mean and standard deviation, etc.) over the incoming data, by analyzing incoming data using a rolling window (e.g., "the last 30 events," etc.), by applying a complex graphical model (e.g., Markov models, etc.) to the sequence of incoming events, by computing a probability distribution of the characteristics of the incoming data, etc.

In some embodiments, preprocessing the collected DHCP information may include decoding various field, such as vendor encapsulated options within vendor-opts data. The decoded values may be separated into individual features, such as device type, embedded-components-list, deviceserial-number, hardware-version-number, software-version-number, boot-rom-version, organizationally unique identifier (OUI), vendor-OUI, model-number, and vendor-name. Preprocessing the collected DHCP information may also include encoding categorical variables through various treatments, such as via one-hot encoding or ordinal encoding. In addition, past additional data collected for the MAC address on an associated CMTS may be used to further enhance the data for modeling or feature creation.

In some embodiments, the computing system may be configured to collect and use previous aggregated IPDR and Subscriber Account Management Interface Specification (SAMIS) data for tonnage (e.g., passed downstream and upstream traffic or bytes), and/or other aggregated measures collected from deep packet inspection (DPI) or sampled records for enhanced modeling or feature creation. Such data may also be archived and used to select a responsive action or otherwise enhance real-time decision event processing.

In some embodiments, the computing system may be configured to collect and use billing information, provisioning information, supply chain or other inventory system information for modeling or feature creation, such as to determine additional features for the classification model or to determine additional decision actions.

In some embodiments, the computing system may be configured to use past DHCP data to train the classification models.

For example, assume that a target variable (Y) represents known legitimate and illegitimate devices which are labeled accordingly. A classification model may be trained to predict the likelihood that a device is in each specific classification (legitimate or illegitimate) based on these engineered features. Various predictive modeling techniques may be used for this model formulation, including but not limited to various classification models including linear classifiers, decision trees, probabilistic or naïve classifiers, gradient boosted methods, ensemble classifiers, neural networks, and blended models.

The model may be trained using standard machine learning or Artificial Intelligence (AI) training processes for training, validation, and holdout for model validation and evaluation, including any necessary feature reduction techniques. During this process, the model may be trained and chosen over other models and with the same model but with different hyper parameters so that it can produce a best fit model with sufficient generalizability so that it reaches enough complexity to fit the data without producing so much complexity that it overfits that data.

The feature vector $(x_1, x_2, \ldots x_n)$ may be used to predict Y with 1 representing an illegitimate device and 0 representing an legitimate/authorized device where.

$$Y = \begin{cases} 1, & \text{with probability } p, \\ 0, & \text{with probability } 1 - p \end{cases}$$

The model may produce as an output the predicted probability for the positive class (illegitimate device) to align possible decision outcomes with necessary business objectives and may be evaluated using standard classification metrics and approaches. These classification metrics and approaches may include F1 score, accuracy, log loss, area under curve (AUC), sensitivity and specificity, precision, lift, gain, and other standard evaluation techniques.

Once created and trained, the obtained predictive model (e.g., classification model, etc.) may be stored on a computer, which may include the model's input variable information and scoring code. This stored predictive model may produce scored outputs of the likelihood of an authorized device (p) based on a transmitted feature vector it receives as an input. The storage of this predictive model may be on a computer that serves Application Programming Interface (API) calls and responses. In other embodiments, the predictive model may be stored closer to DHCP servers so as to minimize latency in scoring. After the predictive model is stored, the predictive model may be used for scoring on either a batch, near real-time, or real-time basis. Regardless of the timing basis, a dataset consisting of i feature vectors may be inputted into the predictive model in response to new DHCP logs being received by a DHCP server.

In embodiments in which an API call is made, once a DHCP server receives a new DHCP request i, the associated features may be preprocessed, which as discussed above, may include decoding various field, separating the decoded values into individual features, encoding categorical variables through various treatments, etc. The feature vector for i may then be engineered and sent via an API call to the prediction server containing the stored model. At this point, the prediction server may provide an output for i consisting of the predicted probability score. All data in the process including raw DHCP logs, engineered features for each transaction i and model results may be stored in a database or data archive. In addition, these results may be sent to a decision engine for further event processing.

Based on the model output scores and business objectives, a decision engine may make real-time choices for actions such as immediate shut down, the prevention of getting a DHCP lease, isolation, behavior surveillance, altering, if-then-else event generation, etc. For example, based on optimal model thresholds to minimize false positives and/or false negatives, the business rule engine may establish a rule that all devices that meet or exceed a certain probability p may be immediately shutdown. Other cases may be marked in a database for further monitoring. For instance, devices that associate with other perceived threats, such as video piracy, may be marked in a database for further monitoring and behavior surveillance. These operations may be performed in real-time or near-real time so that model scoring runs before a lease is granted by the DHCP server. These operations are also effective for devices that have already been granted a prior lease.

By performing the above described operations, devices exceeding the determined model threshold based on the model output may included as inputs for a blacklisting process on the CMTS. Once a device MAC address is added to the CMTS blacklist the CMTS will ignore the device and not grant network access to the MAC address.

For predicted illegitimate devices, the results may be compared to a database containing all cases of persistent cases of duplicated MAC addresses on the network. The database may store all known CMTS devices on which a duplicated MAC address has been detected. A device that is predicted to be illegitimate and matches a known duplicated MAC addresses may be subclassified as an illegitimate clone device. A device that is predicted to be illegitimate and does not match a known duplicated MAC addresses may be subclassified as a rogue device.

In some embodiments, the computing system may be configured to provide feedback of actual determined classifications for archiving and for model refinement in addition to serving as a model performance mechanism. For terminated devices based on model outputs, the automated system for device blacklisting may provide back to the model feedback for each case the true label of each device. Thus, if a device is determined to be a legitimate device (e.g. a proven legitimate customer calls to report a service disruption after customers device or MAC address is blacklisted, etc.), this information will be passed back to the model training process so that the model can improve over time and to be archived so that model operations no longer negatively affect this customer's service. On the other hand, if no legitimate customer is identified, any device predicted as illegitimate by the model can be assumed to be correct in its predicted classification.

In some embodiments, the computing system may be equipped with a model performance system that enables the entity to track the performance of the model over time, including the rate of true positives, false positives, true negatives, and false negatives.

In addition to automated classification of devices for event decisions, in some embodiments the computing system may be configured to perform additional monitoring of TOS devices to capture MAC addresses and associated CMTSs.

In some embodiments, the computing system may be configured to isolate detected clone modems and/or to use association rule techniques to examine likely fraud ring or fraudulent associated network activity. Association mining or another unsupervised modeling technique may be used to identify association rules for retaining companies to identify related product purchases. Using association rule formulation with a transaction database T consisting of transactions t represented as a binary vector with $t[k]=1$ if t bought an item $I_k$ and $t[k]=0$ otherwise. A tuple exists in the database for each transaction, and a transaction t satisfies X if for all items Ik in X, $t[k]=1$. Association rules mean the implication $X \rightarrow Ij$, where X is a set of some items in I, and Ij is a single item in I that is not present in X. The rule $X \rightarrow Ij$ is satisfied in the set of transactions T with the confidence factor $0<=c<=1$ if at least c % of transactions in T that satisfy X also satisfy Ij. Similarly, this detection system may treat each MAC address as a transaction t, with individual CMTS devices considered as items I. Thus, each MAC addresses is identified with all the various CMTSs that this MAC address has been duplicated over.

In some embodiments, the computing system may be configured to determine association rules that identify which CMTS devices relate to each other based on associations with connected MAC addresses. The computing system may examine strong lift and confidence values in these rules for a possible connected fraud ring clone activity. For example, a processor in the computing system may determine association rules that identify relationships between two or more CMTS devices based on associations with connected MAC addresses, and analyze the strong lift and confidence values in the association rules for connected fraud ring clone activity (e.g., in response to predicting that a device is an illegitimate device, etc.).

The various embodiments improve the security, performance, efficiency and functioning of the service provider network and the components/devices that are included in, utilize, or benefit from the service provider network. For example, by quickly and efficiently identifying and responding to illegitimate devices, the various embodiments may reduce, limit or prevent ToS attacks. The embodiments may also effectively and significantly reduce other negative effects (e.g., network congestion, anonymous cyberattacks, revenue loss, etc.) caused by illegitimate devices.

FIG. 1 is a simplified example of a network 100 that may be used to implement the various embodiments. In the example illustrated in FIG. 1, the network 100 includes user equipment (UE) 104 device, a customer premise equipment (CPE) 106 device, a bridged residential gateway (BRG) 108, a cable modem (CM) 110, a cable modem termination system (CMTS) 112, a service provider network 114, a Multi-Service Broadband Network Gateway (MS-BNG) 116 component, a Virtual Gateway (vG) 118 component, a carrier-grade network address translation (CGNAT) 120 component, a DHCP 122 component, a subscriber management 124 component, a policy 126 component, a datacenter 128 component, a virtual machine 130 component, and a virtual network-attached storage (NAS) 132 component.

In the example illustrated in FIG. 1, some of the components and functions typically associated with a CM 110 or CPE 106, such as the DHCP 122 component, may be included in the network or are distributed between the BRG 108 in CPE 106 and the MS-BNG 116 or vG 118. However, it should be understood that these components and functions may be included in or performed by the CM 110, CPE 106, or other component in the network 100. For example, in some embodiments, the DHCP 122 component may be included as part of the CPE 106.

The CM 110 may be a network bridge that provides bi-directional data communication via radio frequency channels on a hybrid fiber-coaxial (HFC) and/or radio frequency over glass (RFoG) infrastructure. The CMTS 112 component may be configured to facilitate high speed communications between the CM 110 and the components within the service provider network 114. The service provider network 114 may include various network components for providing consumers with access to the Internet 136 or IP services over broadband connections.

The DHCP 122 component may be an independent platform (with the MS-BNG 116 operating as a DHCP relay) or may be hosted by or within the MS-BNG 116. The DHCP 122 component may be configured to dynamically assign an IP address to the cable modem 110 and/or UE 104 device as part of a lease assignment. The CM 110 and/or UE 104 may utilize the assigned IP address to communicate with other devices for a time period identified by the lease (lease period).

As an example, to establish IP connectivity to the service provider network 114 and/or the Internet 136, the CM 110 may generate a DHCP request message that includes various information fields, and send the DHCP request message to the DHCP 122 component. The DHCP 122 component may receive the DHCP request message, and use the information included in the received message to determine whether to grant or deny the requested lease. The DHCP 122 component may generate a DHCP response message that includes network and lease information, and send the message to the CM 110. If the lease is granted, the CM 110 may register the lease with the CMTS 112 establish the IP connection to the service provider network 114 and/or the Internet 136.

Communications may be facilitated via a generic routing encapsulation (GRE) tunnel 152, local area network (LAN) links, Virtual Extensible LAN (VXLAN) links, and other wired or wireless communication links. A GRE path 164 may be carried within a DOCSIS path 166, and a LAN path 162 may be within the GRE path 164. The MS-BNG 116 component may be configured to facilitate communications with the CPE 106 component via the GRE encapsulated tunnel 152. The MS-BNG 116 component and the CPE 106 component may create a logical subscriber link (LSL) between the BRG 108 component and the vG 118 component. The UE 104 communications may be carried over the GRE encapsulated tunnel 152 via an extended LAN. The GRE encapsulated tunnel 152 may depend on the DOCSIS/CMTS path 166 to connect to the CM 110 or CPE 106.

The CGNAT 120 component may be configured to translate private-to-private IP addresses and private-to-public IP addresses. The CGNAT 120 may translate private IP address of the UE 104 component to public IP addresses to allow multiple customer networks to share a common public IP address.

The subscriber management 124 component may store subscriber information and/or perform various subscription management operations. The policy 126 component may be configured to determine and/or enforce various rules and policy decisions. The datacenter 128 component, virtual machine 130 component, and virtual NAS 132 component may provide a commodity hardware and a secure computing infrastructure for hosting the MS-BNG 116 or vG 118 components.

Figure 2:
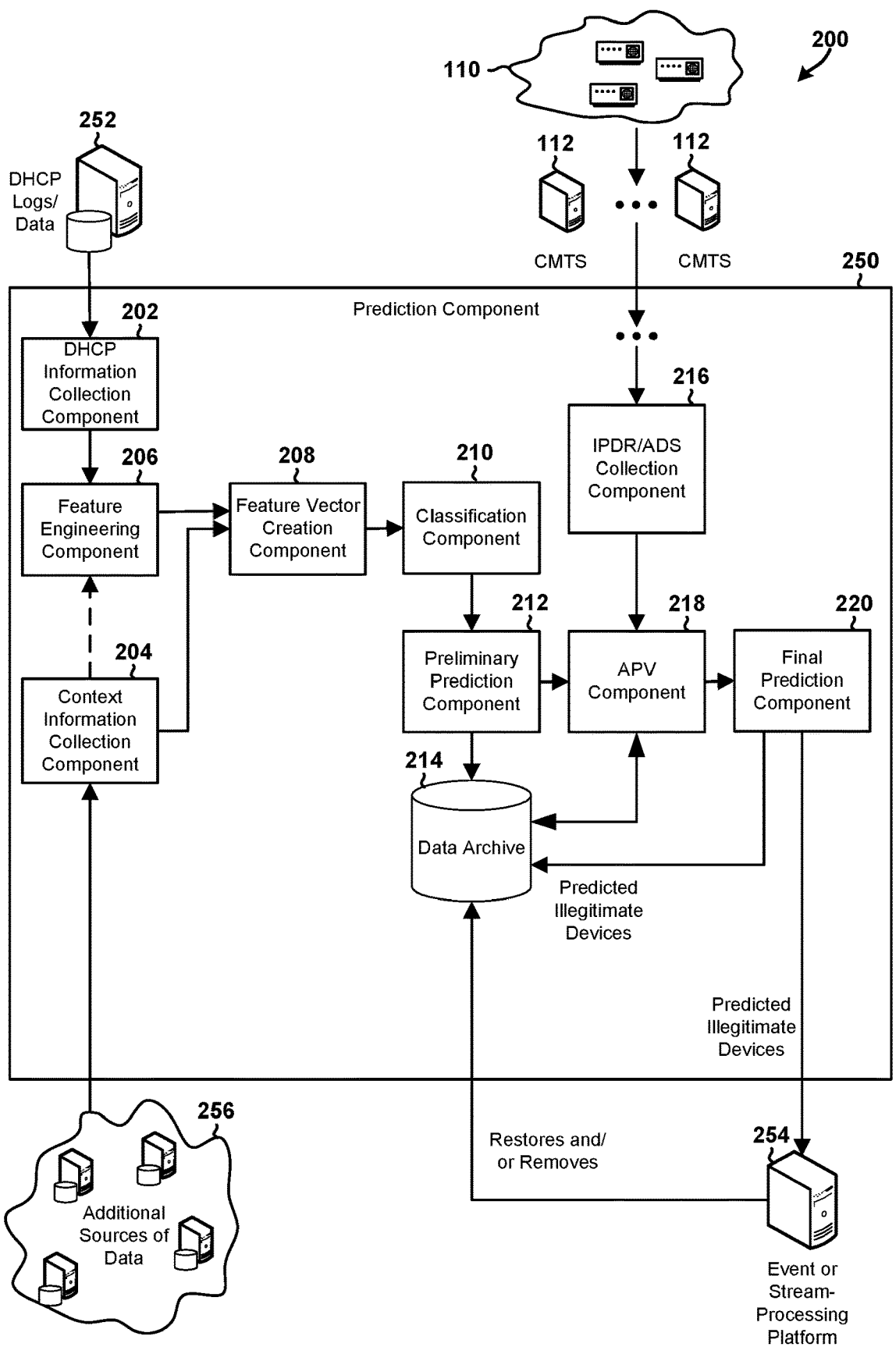
FIG. 2 is a block diagram illustrating components in a system that could be configured to identify and respond to illegitimate devices in accordance with the embodiments.

FIG. 2 illustrates various components and operations in a system 200 that may be configured to collect and use DHCP information to predict, identify, and/or respond to illegitimate devices in accordance with some embodiments. In the example illustrated in FIG. 2, the system 200 includes CMTS 112 components, a predication component 250, a DHCP log/data sever 252, an event/stream processing platform 254, and various additional data servers and sources of data 256.

The CMTS 112 components may be configured to facilitate high speed communications between a multitude of CMs 110 and various components within the service provider network or Internet. As part of these operations, the CMTS 112 components may collect, receive or generate IPDRs and analytics data set (ADS) that may be used to identify cloned modems or duplicates of MAC addresses on the network.

The predication component 250 may be configured to use DHCP information received from the DHCP log/data sever 252 in conjunction with context information received from the other sources of data 254 to classify devices as legitimate devices or illegitimate devices.

The DHCP log/data sever 252 may store DHCP information for the devices evaluated by the predication component 250. The DHCP information may identify a default gateway, domain name, name servers, time servers, MAC addresses, hostnames, client IP address (ciaddr), your client IP address (yiaddr), server IP address (siaddr), gateway address (giaddr), client hardware address (chaddr), DHCP message type, DHCP parameter request list, packet length, message length, DHCP class identifier, vendor-identifying vendor options, enterprise-id, options request option (ORO), optioncode, option length, modem-capabilities, vendor opts option, vendor encapsulated options, DHCP client identifier, DHCP request address, DHCP server identifier, and/or other similar information relevant to devices that request to establish IP connectivity to the network.

The event/stream processing platform 254 may be an expert decisioning engine that is configured to implement responsive actions, such as black listing devices on the CMTS 112 components, and making real-time choices for action (e.g., immediate shut down, isolation, behavior surveillance, if then else event generation, etc.). For example, the event/stream processing platform 254 may kill or remove a CM 110 from the network when it is classified by the predication component 250 as an illegitimate device. The event/stream processing platform 254 may also restore a previously removed CM 110 under various conditions and/or in response to various events, such as in response to a customer notifying the service provider that a CM 110 was incorrectly classified as an illegitimate device, the service provider determining that the customer is a legitimate customer, or the service provider otherwise determining that the CM 110 should not have been removed.

The additional data servers and sources of data 254 may include multiple heterogeneous data sources that provide context information that may be used by the predication component 250 to engineer features and/or predict whether a MAC address or CM 110 is an illegitimate device.

The predication component 250 may include a DHCP information collection component 202, a context information collection component 204, a feature engineering component 206, a feature vector creation component 208, a classification component 210, a preliminary prediction component 212, a data archive 214, an IPDR or analytics data set (ADS) collection component 216, an additional processing and validation (APV) component 218, and a non-preliminary or final prediction component 220.

The DHCP information collection component 202 may be configured to receive or collect DHCP information from the DHCP log/data sever 252. Similarly, the context information collection component 204 may be configured to collect context information from additional data servers and sources of data 254.

The feature engineering component 206 may be configured to engineer features based on the DHCP information (and/or optionally the context information). Engineering the features may include creating, defining, determining, identifying and/or selecting features that are most relevant to accurately classifying a CM 110 as a legitimate device or an illegitimate device.

The feature vector creation component 208 may be configured to generate feature vectors based on the engineered features and/or the context information.

The classification component 210 may be configured to train and select classification models, and apply the feature vectors to the selected classification models to generate an output or analysis results. For example, the classification component 210 may select the best ensemble model that can best classify the MAC address or CM 100 with the highest score or the highest degree of confidence. The classification component 210 may also select the best model for fit, precision, sensitivity and/or stability, etc. In some embodiments, the classification component 210 may select the model based on the types of decision nodes included in the model, the engineered features, the feature vectors, the context information, and/or the DHCP information.

The preliminary prediction component 212 may be configured to evaluate the output or analysis results of the classification component 210 to determine whether the CM 110 should be classified as a legitimate device or an illegitimate device. The preliminary prediction component 212 may also preliminarily classify the CM 110 as a legitimate or illegitimate device. The preliminary prediction component 212 may store the evaluation or preliminarily classification results in a data archive 214.

The IPDR/ADS collection component 216 may be configured to collect IPDRs and/or ADSs from the CMTS 112 components. The IPDRs/ADSs may be used to identify instances of duplicate MAC addresses on the network, determine the upstream and downstream behaviors of the CMTS 112 components, and/or determine the behaviors of the multitude of CMs 110, UEs 104 or subscribers connected to the network via the CMTS 112 components.

The APV component 218 may be configured to use the preliminarily classification results of the preliminary prediction component 212, information stored in the data archive 214, information from the IPDR/ADS collection component 216, and/or other supplementary information (e.g., risk and economic determinations, etc.) to validate the preliminary classification of the CM 110 and/or to implement additional business engine rules.

For example, the APV component 218 may be configured to use the information from the IPDR/ADS collection component 216 to identify instances of duplicate MAC addresses on the network, determine whether any of the duplicate MAC addresses are persistent duplicates (e.g., are occurring for 96 persistent cycles in a day, have been present for over 24 hours, etc.), and validate the preliminary classification of the CM 110 based on whether there are any persistent duplicates of the CM 110 or its MAC address. In addition to validating the preliminary classification or the model based on the presence of duplication or cloning, additional validation may occur through validating that an identified illegitimate device does not correspond to an active billed customer, and thus represents a rogue device. The APV component 218 may also identify the CMTS 112 component associated with the classified CM 110 and/or store information identifying all CMTS devices on which a duplicated MAC address has been detected in the data archive 214.

As a further example, the APV component 218 may be configured to determine that there are multiple persistent duplicates of the CM 110, and implement a business engine rule that ensures that only one of the persistent duplicates is terminated by the event or stream processing platform 254. As another example, the APV component 218 may establish a rule that all devices that meet or exceed a certain probability p are to be immediately shutdown.

The final prediction component 220 may be configured to finalize the preliminary classifications and/or subclassify the devices (e.g., as rogue, orphan, clone, etc.). For example, a CM 110 that is preliminarily classified as illegitimate and determined to match a known duplicated MAC addresses may be subclassified as an illegitimate clone device. A CM 110 that is preliminarily classified as illegitimate and determined to not match any known duplicated MAC addresses may be subclassified as a rogue device. The final prediction component 220 may cause the event/stream processing platform 254 to take a responsive action based on the business engine rules and/or the classifications. In addition, The final prediction component 220 may store the final/actual classifications, any of the information used for the classifications (e.g., the classifier models used, the engineered features, the collected data, etc.), and/or information identifying the responsive actions in the data archive 214.

The data stored in the data archive 214 may be used by the prediction component 250 to improve the accuracy of classification in subsequent iterations. For example, if a CM 110 is determined to be an illegitimate device and removed from the network, and later a legitimate customer calls to report a service disruption, the system 200 may restore the CM 110 and store information in the data archive 214 indicating that the CM 110 was classified incorrectly, the features and models used for the classification, and other similar information. The prediction component 250 may use this information to adjust its operations or refine its models (e.g., by retraining the models, modifying the test conditions, adjusting the weights associated with the test conditions, etc.).

Figure 3:
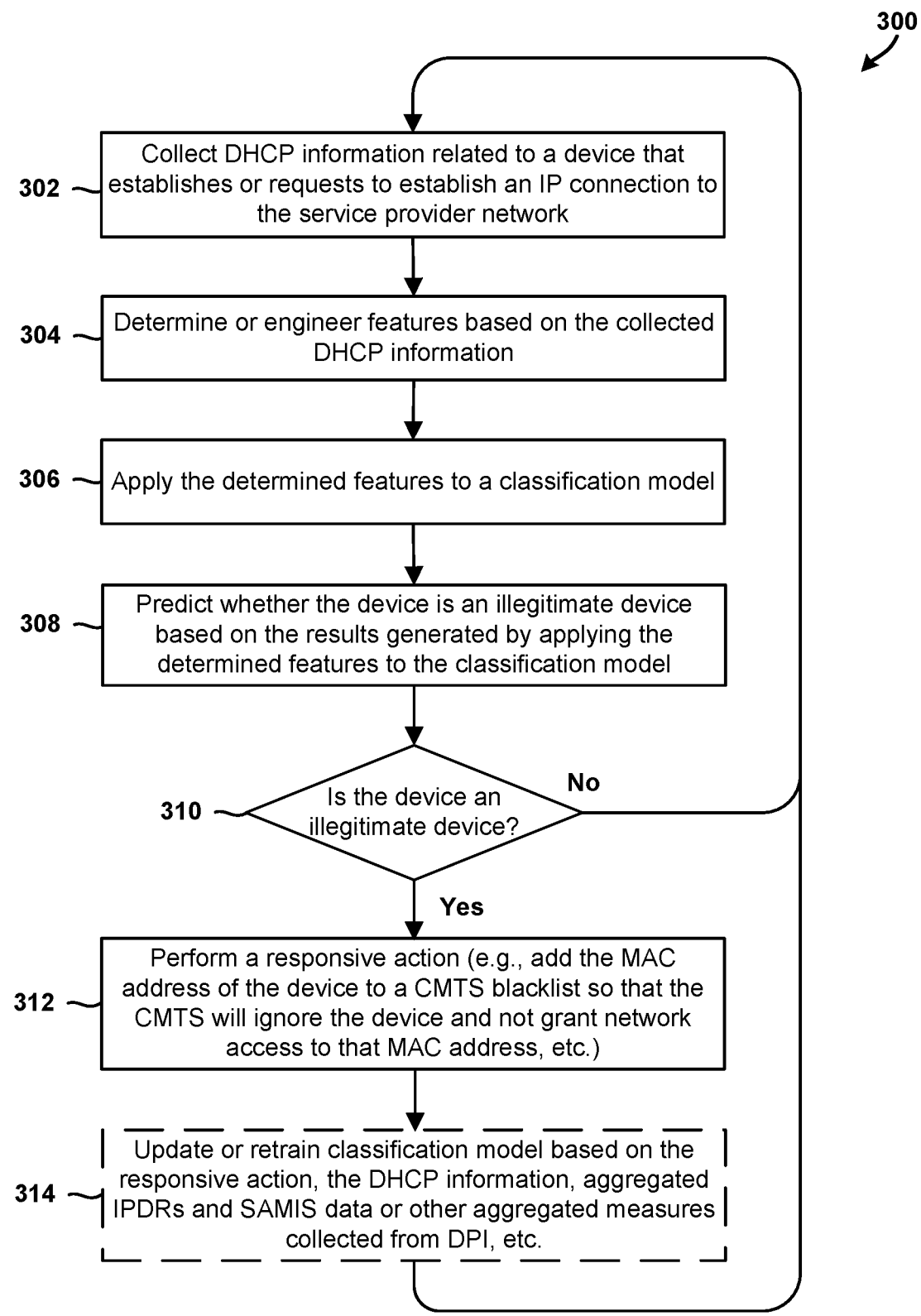
FIG. 3 is a process flow diagram that illustrates a method for identifying and responding to illegitimate devices in accordance with some embodiments.

FIG. 3 illustrates a method 300 for identifying and responding to illegitimate devices in accordance with some embodiments. Method 300 may be performed by a processor in a computing system (e.g., security server, DHCP server, etc.).

In block 302, the processor (or computing system) may collect DHCP information related to a device (e.g., a cable modem, etc.) that establishes or requests to establish an IP connection to the service provider network. Examples of different types of DHCP information that could be collected in block 302 include client IP address (ciaddr), your client IP address (yiaddr), server IP address (siaddr), gateway address (giaddr), client hardware address (chaddr), DHCP message type, DHCP parameter request list, packet length, message length, DHCP class identifier, vendor-identifying vendor options, enterprise-id, options request option (ORO), option-code, option length, modem-capabilities, vendor opts option, vendor encapsulated options, DHCP client identifier, DHCP request address, DHCP server identifier, etc.

In block 304, the processor may determine or engineer features based on the collected DHCP information. As discussed above, engineering the features may include creating, defining, determining, identifying and/or selecting features that are most relevant to accurately classifying a MAC address or associated device as a legitimate device or as an illegitimate device. In some embodiments, the processor may be configured to determine the features in block 304 by decoding DHCP fields in a DHCP log to generate one or more decoded values, and separating the decoded values into one or more individual features. For example, in block 304, the processor may decode a vendor encapsulated options field within a vendor-opts data field to generate decoded values, and separate the decoded values into a device type, an embedded-components-list, a device-serial-number, a hardware-version-number, a software-version-number, a boot-rom-version, an organizationally unique identifier (OUI), a vendor-OUI, a model-number, and/or a vendor-name.

In block 306, the processor may apply the determined features to a classification model to generate analysis results. As explained above, the classification model may include a plurality of decision nodes that each include a weight value and a test condition. By applying the determined features to the classification model, the computing system may generate a plurality of numeric values that each provide an answer to a condition tested by one of plurality of decision nodes. The computing system may then compute a weighted average of the plurality of numeric values.

In block 308, the processor may predict whether the device is an illegitimate device based on the result of applying the determined features to the classification model. In some embodiments, the processor may predict whether the device is an illegitimate device based on the weighted average (or other analysis/evaluation results) generated by applying the determined features to the classification model. For example, the processor may determine whether the weighted average exceeds a threshold value. The processor may classify the device as an illegitimate device in response to determining that the weighted average exceeds the threshold value. In this example, the processor does not classify the device (as either illegitimate device or legitimate) if the weighted average does not exceed the threshold value. Said another way, while an analysis result that exceeds the threshold value may be indicative of a high probability that the evaluated device is illegitimate, an analysis result that does not exceed the threshold value does not indicate that the device is legitimate.

In block 310, the processor may determine whether the device was classified as an illegitimate device in block 308. In response to determining that the device was not classified (i.e., determination block 310="No"), the processor may continue to monitor the network to identify and respond to illegitimate devices by collect DHCP information for another device in block 302.

In response to determining that the device was classified an illegitimate device (i.e., determination block 310="Yes"), the processor may select and preform a responsive action in block 312. For example, the processor may add the MAC address of the device to a CMTS blacklist so that the CMTS will ignore the device and not grant network access to that MAC address. In some embodiments, the processor may make real-time choices and select the responsive action based on the behaviors or conditions present on the network. Examples of such responsive actions include immediate shut down, the prevention of getting a DHCP lease, isolation, behavior surveillance, altering if-then-else event generation, etc.

In some embodiments, after performing the responsive action in block 312, the processor may continue to monitor the network to identify and respond to illegitimate devices by collecting DHCP information for another device in block 302.

In block 314, the processor may update or retrain classification model based on the responsive action, the DHCP information, aggregated IPDRs and SAMIS data or other aggregated measures collected from DPI, etc. The processor may then continue to monitor the network to identify and respond to illegitimate devices by collecting DHCP information for other devices in block 302.

Figure 4:
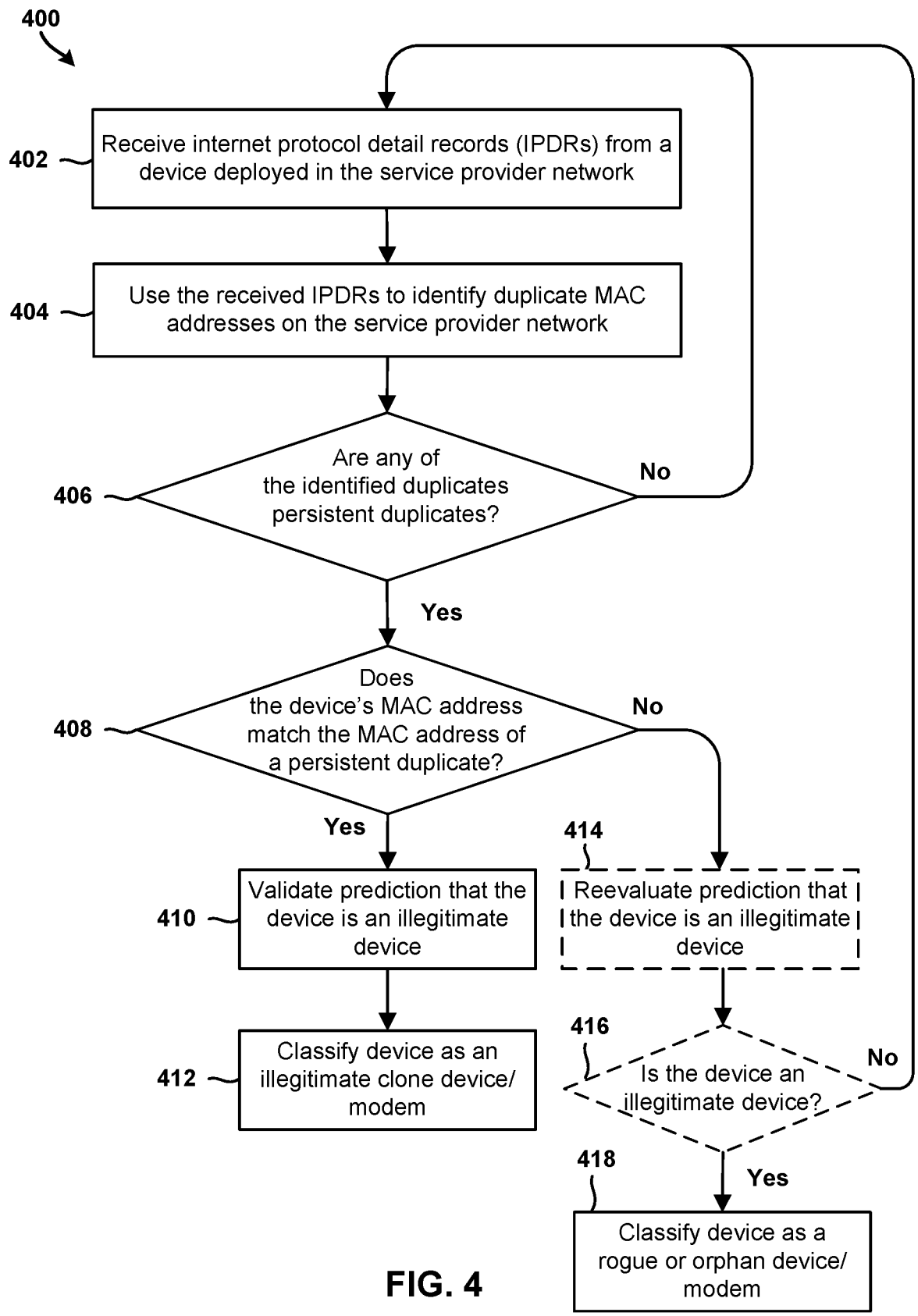
FIG. 4 is a process flow diagram that illustrates a method for validating a prediction that a device/modem is an illegitimate device and classifying the device/modem based on the validation in accordance with an embodiment.

FIG. 4 illustrates a method 400 for validating a prediction that a device/modem is an illegitimate device and classifying the device/modem based on the validation in accordance with an embodiment. Method 400 may be performed by a processor in a computing system (e.g., security server, DHCP server, etc.). All or portions of method 400 may be performed after a device is predicted to be an illegitimate device (e.g., in block 310 of method 300, etc.).

In block 402, the processor may receive IPDRs (or other similar information) from one or more network components (e.g., access network equipment, etc.) deployed in the service provider network. As discussed above, an IPDR is a record that includes information about IP-based service usage and other activities of devices that have established an IP connection to the network.

In block 404, the processor may use the information included in the received IPDRs to identify duplicate MAC addresses on the service provider network. Because there may be up to 30 million devices connected to the network at any given time, there are often many instances duplicate MAC addresses present on the network. However, most of these duplicate MAC addresses are intermittent.

In determination block 406, the processor may determine whether any of the identified instances duplicate MAC addresses are persistent duplicates (e.g., have occurred for 96 persistent cycles in a day, have been present for over 24 hours, etc.). In response to determining that none of the identified instances duplicate MAC addresses are persistent duplicates (i.e., determination block 406="No"), the processor may continue to receive and use IPDRs to identify duplicate MAC addresses in blocks 402 and 404.

In response to determining that there are persistent duplicates on the network or that at least one of the identified instances duplicate MAC addresses is a persistent duplicate (i.e., determination block 406="Yes"), the processor may determine whether the MAC address of the device being evaluated matches or is the same as the MAC address of a persistent duplicate in determination block 408.

In response to determining that the MAC address of the device being evaluated matches or is the same as the MAC address of at least one persistent duplicate (i.e., determination block 408="Yes"), the processor may validate the prediction that the device is an illegitimate device in block 410. That is, if the device is both predicted to be illegitimate device and includes a persistent duplicate, there is a high probably that the classification of the device as an illegitimate device is correct. In block 412, the processor may classify the device as an illegitimate clone device/modem. The processor may also validate the model used for the classification and/or that an identified illegitimate device does not correspond to an active billed customer.

In response to determining that the MAC address of the device being evaluated does not match the MAC address of at least one persistent duplicate (i.e., determination block 408="No"), the processor may reevaluate its prediction that the device is an illegitimate device in block 414. For example, the processor may evaluate additional features, select a stronger or more robust classification model, adjust the threshold, or perform additional or more robust classification operations to ensure that the device is properly classified an illegitimate device.

In determination block 416, the processor may perform any or all of the operations discussed in this application (e.g., the operations in block 310 of method 300, etc.) to determine or predict whether the device being evaluated is an illegitimate device. In response to determining that the device being evaluated is not an illegitimate device (i.e., determination block 416="No"), the processor may continue to receive and use IPDRs to identify duplicate MAC addresses in blocks 402 and 404. In response to determining that the device being evaluated is an illegitimate device (i.e., determination block 416="Yes"), the processor may classifies the device as a rogue device/modem or as an orphan device/modem in block 418.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 300 and 400 may be substituted for or combined with one or more operations of the methods 300 and 400, and vice versa.

Figure 5:
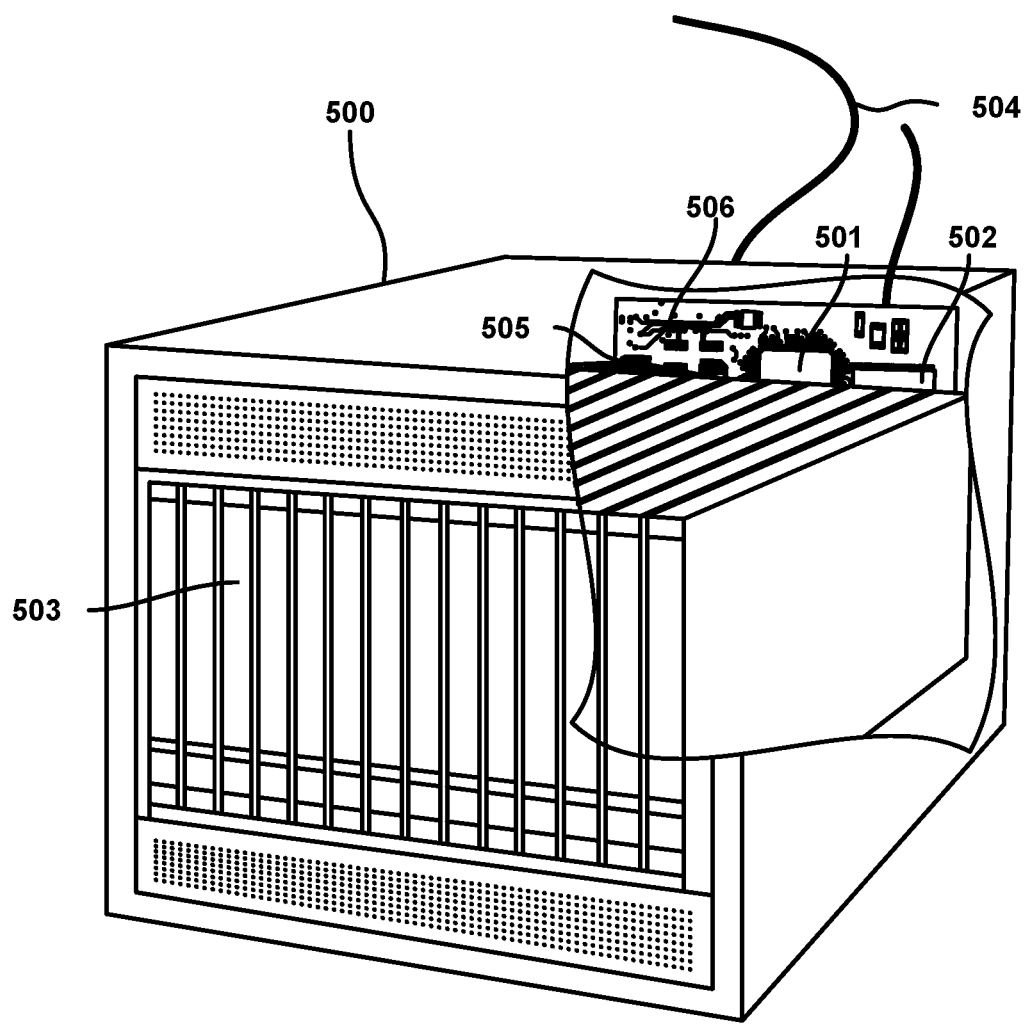
FIG. 5 is a component diagram of an example server suitable for implementing the various embodiments.

Various embodiments (including, but not limited to, embodiments discussed above with reference to FIGS. 1-4) may be implemented on any of a variety of commercially available computing devices, such as the server computing device 500 illustrated in FIG. 5. Such a server device 500 may include a processor 501 coupled to volatile memory 502 and a large capacity nonvolatile memory, such as a disk drive 503. The server device 500 may also include a floppy disc drive, USB, compact disc (CD) or digital video disc (DVD) disc drive coupled to the processor 501. The server device 500 may also include network access ports 506 coupled to the processor 501 for establishing data connections with a network connection circuit 504 and a communication network (e.g., IP network) coupled to other communication system network elements.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

As used in this application, terms such as "component," "system," "engine," and the like may refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing system. By way of illustration, both an application running on a computing system and the computing system may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing systems, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, Flash memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of identifying and responding to illegitimate devices on a service provider network, the method comprising:

collecting dynamic host configuration protocol (DHCP) information related to a device that establishes or requests to establish an internet protocol (IP) connection to the service provider network;
determining based on the collected DHCP information, one or more feature information units that each represent at least one of an activity or behavior associated with the service provider network;
applying the determined one or more feature information units to a classification model;
predicting whether the device is an illegitimate device based on a result of applying the determined one or more feature information units to the classification model; and
performing a responsive action in response to predicting that the device is an illegitimate device.

2. The method of claim 1, further comprising validating the prediction of whether the device is an illegitimate device based on the result of applying the determined one or more feature information units to the classification model.

3. The method of claim 2, wherein validating the prediction of whether the device is an illegitimate device based on the result of applying the determined one or more feature information units to the classification model comprises:
receiving internet protocol detail records (IPDRs) from a network device deployed in the service provider network;
using the received IPDRs to identify duplicate media access control (MAC) addresses on the service provider network;
determining whether any of the identified duplicate MAC addresses are persistent duplicates;
determining whether a MAC address of the device matches the MAC address of at least one of the persistent duplicates; and
validating that the device is an illegitimate device in response to determining that the MAC address of the device matches the MAC address of at least one of the persistent duplicates.

4. The method of claim 2, wherein validating the prediction of whether the device is an illegitimate device based on the result of applying the determined one or more feature information units to the classification model comprises:
determining whether the device corresponds to at least one active billed customer account; and
validating that the device is an illegitimate device in response to determining that the device does not correspond to the at least one active billed customer account.

5. The method of claim 1, wherein performing the responsive action in response to predicting that the device is an illegitimate device comprises at least one or more of:
performing the responsive action prior to a DHCP server granting a DHCP lease to the device;
performing the responsive action prior to the device registering the DHCP lease with a cable modem termination system (CMTS); or
performing the responsive action prior to the device establishing the IP connection to the service provider network.

6. The method of claim 1, wherein determining the one or more feature information units based on the collected DHCP information comprises:
decoding one or more DHCP fields in a DHCP log to generate one or more decoded values; and
separating the one or more decoded values into one or more individual features.

7. The method of claim 6, wherein:
decoding the one or more DHCP fields in the DHCP log to generate the one or more decoded values comprise decoding at least one or more of a vendor encapsulated options field within a vendor-opts data field in the DHCP log to generate the one or more decoded values; and
separating the one or more decoded values into the one or more individual features comprise separating the one or more decoded values into at least one or more of a device type, an embedded-components-list, a device-serial-number, a hardware-version-number, a software-version-number, a boot-rom-version, an organizationally unique identifier (OUI), a vendor-OUI, a model-number, or a vendor-name.

8. The method of claim 1, wherein:
collecting the DHCP information related to the device that establishes or requests to establish the IP connection to the service provider network comprises collecting the DHCP information related to a cable modem that establishes or requests to establish the IP connection to the service provider network; and
performing the responsive action in response to predicting that the device is an illegitimate device comprises blacklisting the cable modem on a cable modem termination system (CMTS) in response to predicting that the cable modem is an illegitimate device.

9. The method of claim 1, further comprising selecting the responsive action based on the result of applying the determined one or more feature information units to the classification model.

10. The method of claim 1,
wherein the classification model includes a plurality of decision nodes that each include a weight value and a test condition;
wherein applying the determined one or more feature information units to the classification model comprises:
generating a plurality of numeric values that each provide an answer to a condition tested by one of plurality of decision nodes; and
computing a weighted average of the plurality of numeric values; and
wherein predicting whether the device is an illegitimate device based on the result of applying the determined one or more feature information units to the classification model comprises:
determining whether the computed weighted average exceeds a threshold value; and
classifying the device as an illegitimate device in response to determining that the weighted average exceeds the threshold value.

11. The method of claim 1, further comprising retraining the classification model based on at least one or more of:
previous responsive actions;
previous DHCP information;
previous aggregated internet protocol detail records (IPDRs) and subscriber account management interface specification (SAMIS); or
previous aggregated measures collected from deep packet inspection (DPI).

12. The method of claim 11, further comprising predicting whether another device is an illegitimate device based on the result of applying the determined one or more feature information units to the retrained classification model.

13. The method of claim 1, further comprising:
determining association rules that identify relationships between two or more cable modem termination systems (CMTSs) based on associations with connected media access control (MAC) addresses; and analyzing strong lift and confidence values in the association rules to detect connected fraud ring clone activity.

14. A computing system, comprising:
a processor configured with processor-executable instructions to:
collect dynamic host configuration protocol (DHCP) information related to a device that establishes or requests to establish an internet protocol (IP) connection to a service provider network;
determine features based on the collected DHCP information, wherein the features are units of information that represent at least one of an activity or behavior associated with the service provider network;
apply the determined one or more feature information units to a classification model;
predict whether the device is an illegitimate device based on a result of applying the determined one or more feature information units to the classification model; and
perform a responsive action in response to predicting that the device is an illegitimate device.

15. The computing system of claim 14, wherein the processor is further configured to:
validate the prediction of whether the device is an illegitimate device based on the result of applying the determined one or more feature information units to the classification model.

16. The computing system of claim 15, wherein the processor is configured to validate the prediction of whether the device is an illegitimate device based on the result of applying the determined one or more feature information units to the classification model by:
receiving internet protocol detail records (IPDRs) from a network device deployed in the service provider network;
using the received IPDRs to identify duplicate media access control (MAC) addresses on the service provider network;
determining whether any of the identified duplicate MAC addresses are persistent duplicates;
determining whether a MAC address of the device matches the MAC address of at least one of the persistent duplicates; and
validating that the device is an illegitimate device in response to determining that the MAC address of the device matches the MAC address of at least one of the persistent duplicates.

17. The computing system of claim 15, wherein the processor is configured to validate the prediction of whether the device is an illegitimate device based on the result of applying the determined one or more feature information units to the classification model by:
determining whether the device corresponds to at least one active billed customer account; and
validating that the device is an illegitimate device in response to determining that the device does not correspond to the at least one active billed customer account.

18. The computing system of claim 14, wherein the processor is configured to perform the responsive action in response to predicting that the device is an illegitimate device by:
performing the responsive action prior to a DHCP server granting a DHCP lease to the device;
performing the responsive action prior to the device registering the DHCP lease with a cable modem termination system (CMTS); or
performing the responsive action prior to the device establishing the IP connection to the service provider network.

19. The computing system of claim 14, wherein the processor is further configured to determine the one or more feature information units based on the collected DHCP information by:
decoding one or more DHCP fields in a DHCP log to generate one or more decoded values; and
separating the one or more decoded values into one or more individual features.

20. The computing system of claim 19, wherein the processor is configured to:
decode the one or more DHCP fields in the DHCP log to generate the one or more decoded values by decoding at least one or more of a vendor encapsulated options field within a vendor-opts data field in the DHCP log to generate the one or more decoded values; and
separate the one or more decoded values into the one or more individual features by separating the one or more decoded values into at least one or more of a device type, an embedded-components-list, a device-serial-number, a hardware-version-number, a software-version-number, a boot-rom-version, an organizationally unique identifier (OUI), a vendor-OUI, a model-number, or a vendor-name.

21. The computing system of claim 14, wherein the processor is configured to:
collect the DHCP information related to the device that establishes or requests to establish the IP connection to the service provider network by collecting the DHCP information related to a cable modem that establishes or requests to establish the IP connection to the service provider network; and
perform the responsive action in response to predicting that the device is an illegitimate device by blacklisting the cable modem on a cable modem termination system (CMTS) in response to predicting that the cable modem is an illegitimate device.

22. The computing system of claim 14, wherein the processor is further configured to select the responsive action based on the result of applying the determined one or more feature information units to the classification model.

23. The computing system of claim 14,
wherein the classification model includes a plurality of decision nodes that each include a weight value and a test condition;
wherein the processor is configured to apply the determined one or more feature information units to the classification model by:
generating a plurality of numeric values that each provide an answer to a condition tested by one of plurality of decision nodes; and
computing a weighted average of the plurality of numeric values; and
wherein predicting whether the device is an illegitimate device based on the result of applying the determined one or more feature information units to the classification model comprises:
determining whether the computed weighted average exceeds a threshold value; and
classifying the device as an illegitimate device in response to determining that the weighted average exceeds the threshold value.

24. The computing system of claim 14, wherein the processor is further configured to retrain the classification model based on at least one or more of:
 previous responsive actions;
 previous DHCP information;
 previous aggregated internet protocol detail records (IP-DRs) and subscriber account management interface specification (SAMIS); or
 previous aggregated measures collected from deep packet inspection (DPI).

25. The computing system of claim 24, wherein the processor is further configured to predict whether another device is an illegitimate device based on the result of applying the determined one or more feature information units to the retrained classification model.

26. The computing system of claim 14, wherein the processor is further configured to:
 determine association rules that identify relationships between two or more cable modem termination systems (CMTSs) based on associations with connected media access control (MAC) addresses; and
 analyze strong lift and confidence values in the association rules to detect connected fraud ring clone activity.

27. A non-transitory computer readable storage medium having stored thereon processor-executable software instructions configured to cause a processor in a computing system to perform operations for identifying and responding to illegitimate devices on a service provider network, the operations comprising:
 collecting dynamic host configuration protocol (DHCP) information related to a device that establishes or requests to establish an internet protocol (IP) connection to the service provider network;
 determining features based on the collected DHCP information, wherein the features are units of information that represent at least one of an observed condition, activity or behavior associated with the service provider network;
 applying the determined one or more feature information units to a classification model;
 predicting whether the device is an illegitimate device based on a result of applying the determined one or more feature information units to the classification model; and
 performing a responsive action in response to predicting that the device is an illegitimate device.

28. The non-transitory computer readable storage medium of claim 27, wherein the stored processor-executable software instructions are configured to cause the processor to perform operations further comprising validating the prediction of whether the device is an illegitimate device based on the result of applying the determined one or more feature information units to the classification model.

29. The non-transitory computer readable storage medium of claim 28, wherein the stored processor-executable software instructions are configured to cause the processor to perform operations such that validating the prediction of whether the device is an illegitimate device based on the result of applying the determined one or more feature information units to the classification model comprises:
 receiving internet protocol detail records (IPDRs) from a network device deployed in the service provider network;
 using the received IPDRs to identify duplicate media access control (MAC) addresses on the service provider network;
 determining whether any of the identified duplicate MAC addresses are persistent duplicates;
 determining whether a MAC address of the device matches the MAC address of at least one of the persistent duplicates; and
 validating that the device is an illegitimate device in response to determining that the MAC address of the device matches the MAC address of at least one of the persistent duplicates.

30. The non-transitory computer readable storage medium of claim 28, wherein the stored processor-executable software instructions are configured to cause the processor to perform operations such that validating the prediction of whether the device is an illegitimate device based on the result of applying the determined one or more feature information units to the classification model comprises:
 determining whether the device corresponds to at least one active billed customer account; and
 validating that the device is an illegitimate device in response to determining that the device does not correspond to the at least one active billed customer account.

31. The non-transitory computer readable storage medium of claim 27, wherein the stored processor-executable software instructions are configured to cause the processor to perform operations such that performing the responsive action in response to predicting that the device is an illegitimate device comprises at least one or more of:
 performing the responsive action prior to a DHCP server granting a DHCP lease to the device;
 performing the responsive action prior to the device registering the DHCP lease with a cable modem termination system (CMTS); or
 performing the responsive action prior to the device establishing the IP connection to the service provider network.

32. The non-transitory computer readable storage medium of claim 27, wherein the stored processor-executable software instructions are configured to cause the processor to perform operations such that determining the one or more feature information units based on the collected DHCP information comprises:
 decoding one or more DHCP fields in a DHCP log to generate one or more decoded values; and
 separating the one or more decoded values into one or more individual features.

33. The non-transitory computer readable storage medium of claim 32, wherein the stored processor-executable software instructions are configured to cause the processor to perform operations such that:
 decoding the one or more DHCP fields in the DHCP log to generate the one or more decoded values comprise decoding at least one or more of a vendor encapsulated options field within a vendor-opts data field in the DHCP log to generate the one or more decoded values; and
 separating the one or more decoded values into the one or more individual features comprise separating the one or more decoded values into at least one or more of a device type, an embedded-components-list, a device-serial-number, a hardware-version-number, a software-version-number, a boot-rom-version, an organizationally unique identifier (OUI), a vendor-OUI, a model-number, or a vendor-name.

34. The non-transitory computer readable storage medium of claim 27, wherein the stored processor-executable software instructions are configured to cause the processor to perform operations such that:
  collecting the DHCP information related to the device that establishes or requests to establish the IP connection to the service provider network comprises collecting the DHCP information related to a cable modem that establishes or requests to establish the IP connection to the service provider network; and
  performing the responsive action in response to predicting that the device is an illegitimate device comprises blacklisting the cable modem on a cable modem termination system (CMTS) in response to predicting that the cable modem is an illegitimate device.

35. The non-transitory computer readable storage medium of claim 27, wherein the stored processor-executable software instructions are configured to cause the processor to perform operations further comprising selecting the responsive action based on the result of applying the determined one or more feature information units to the classification model.

36. The non-transitory computer readable storage medium of claim 27,
  wherein the classification model includes a plurality of decision nodes that each include a weight value and a test condition;
  wherein the stored processor-executable software instructions are configured to cause the processor to perform operations such that applying the determined one or more feature information units to the classification model comprises:
    generating a plurality of numeric values that each provide an answer to a condition tested by one of plurality of decision nodes; and
    computing a weighted average of the plurality of numeric values; and
  wherein predicting whether the device is an illegitimate device based on the result of applying the determined one or more feature information units to the classification model comprises:
    determining whether the computed weighted average exceeds a threshold value; and
    classifying the device as an illegitimate device in response to determining that the weighted average exceeds the threshold value.

37. The non-transitory computer readable storage medium of claim 27, wherein the stored processor-executable software instructions are configured to cause the processor to perform operations further comprising retraining the classification model based on at least one or more of:
  previous responsive actions;
  previous DHCP information;
  previous aggregated internet protocol detail records (IPDRs) and subscriber account management interface specification (SAMIS); or
  previous aggregated measures collected from deep packet inspection (DPI).

38. The non-transitory computer readable storage medium of claim 37, wherein the stored processor-executable software instructions are configured to cause the processor to perform operations further comprising predicting whether another device is an illegitimate device based on the result of applying the determined one or more feature information units to the retrained classification model.

39. The non-transitory computer readable storage medium of claim 27, wherein the stored processor-executable software instructions are configured to cause the processor to perform operations further comprising:
  determining association rules that identify relationships between two or more cable modem termination systems (CMTSs) based on associations with connected media access control (MAC) addresses; and
  analyzing strong lift and confidence values in the association rules to detect connected fraud ring clone activity.

* * * * *